A. J. BROWN.
BEARING.
APPLICATION FILED JAN. 14, 1916.
1,227,880.
Patented May 29, 1917.
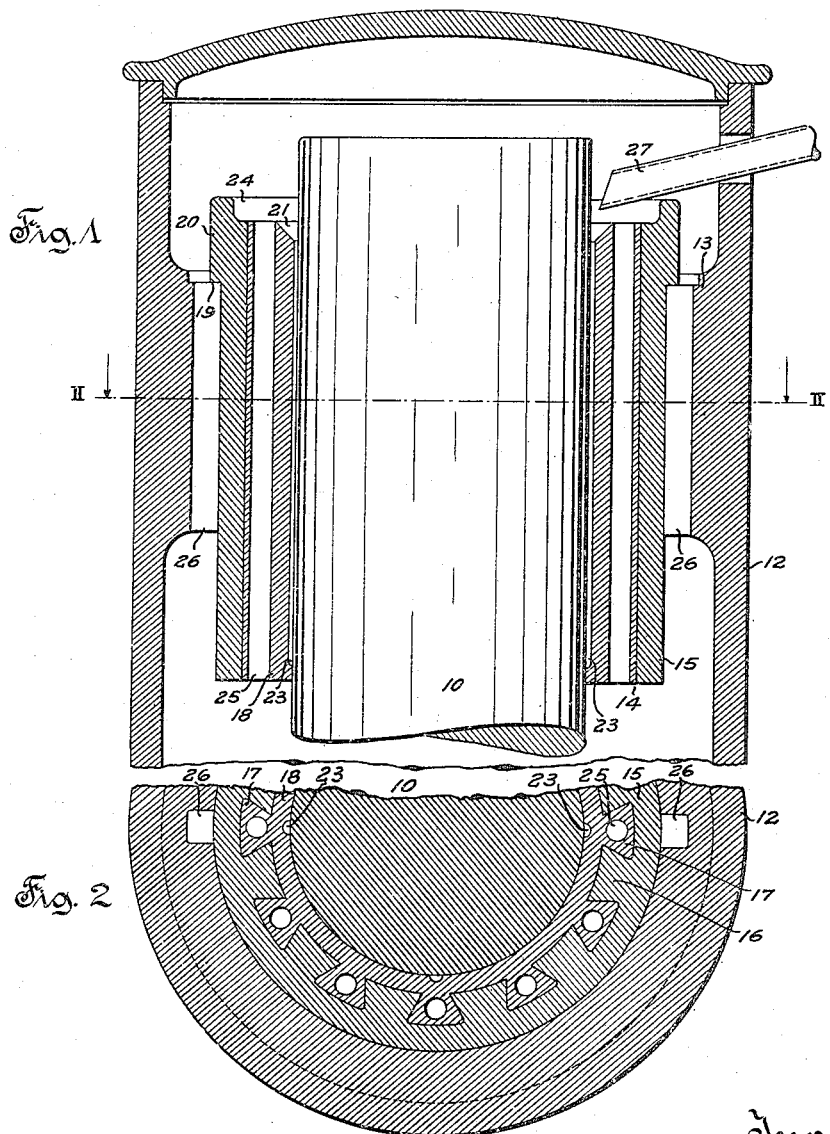

UNITED STATES PATENT OFFICE.

ARTHUR J. BROWN, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

BEARING.

1,227,880.  Specification of Letters Patent.  Patented May 29, 1917.

Application filed January 14, 1916. Serial No. 72,632.

*To all whom it may concern:*

Be it known that I, ARTHUR J. BROWN, a citizen of the United States, residing at Milwaukee, in the county of Milwaukee and State of Wisconsin, have invented a certain new and useful Improvement in Bearings, of which the following is a specification.

This invention relates in general to bearings, and has particular reference to bearings of the type wherein special provision is made for maintaining the parts of the bearing at a safe temperature during ordinary operation.

In certain classes of machines, especially where the operating shafts have high rotative speeds, it is especially desirable that some artificial means be provided for insuring the maintenance of the bearings in a cool operating condition. As it is quite common, in connection with bearings of considerable size, to maintain a circulation of lubricating fluid from one side to the other of the bearing, at which latter point the lubricating fluid is collected and, after being cooled, is again carried to the bearing, it will be apparent that a combination of this lubricating system with a system for artificially maintaining the bearing in cool operating condition is highly desirable, where this combination is possessed of simplicity of construction and efficiency of operation.

It is an object of this invention to provide a bearing of improved construction wherein efficient lubrication of the friction surfaces may be secured and the bearing parts may be maintained in comparatively cool operating condition.

It is a further object of this invention to provide an improved bearing wherein an excess of lubricating fluid supplied to the bearing is utilized for dissipating heat of the bearing.

These and other objects are attained by this invention, the various novel features of which will appear from the description and drawings, disclosing one embodiment of such invention, and will be particularly pointed out in the claims.

In the accompanying drawings:

Figure 1 is a sectional elevation of a shaft bearing embodying features of this invention.

Fig. 2 is a broken cross-sectional view on the line II—II of Fig. 1.

As shown in the drawings, a vertically disposed shaft 10 operates within a bearing housing 12 provided intermediate its ends with an inwardly projecting ledge 13 within which is disposed a bearing 14. This bearing comprises a cylindrical, outer supporting shell 15 of rigid construction and having radially inwardly projecting, undercut teeth or anchors 16 which coöperate with radially outwardly projecting teeth or anchors 17 of complementary shape on a portion 18 of suitable friction material, the latter providing the friction surface of the bearing. The portions 15 and 18 are intimately united, as by casting the latter on the former. The bearing 14 is supported in position by means of a shoulder 19 on the under side of an outwardly extending, flange-like projection 20 at the upper end of the part 15, this shoulder resting on a seat at the upper edge of the ledge 13, and the fit between the part 15 and the inner surface of the ledge 13 being a comparatively close one to definitely position the bearing.

The friction element 18 of the bearing is provided at its upper end with an annular pocket 21, and is also provided on its friction surface with one or more longitudinally extending grooves 23 opening into the pocket 21 at their upper ends. The flange portion 20 of the parts 15 extends upwardly beyond the friction surface of the part 18 to form an annular pocket 24 communicating with the inner pocket 21, the latter of which may be considered as a countersunk portion of the pocket 24. The bearing is provided with longitudinal ducts 25, preferably disposed in the material of the friction element 18 and preferably located in the teeth or anchors thereof, these ducts forming a means of communication between the pocket 24 and the lower end of the bearing, and, in general, being comparatively close to the friction surface whereby a cooling fluid circulating through the ducts readily absorbs heat from the bearing to maintain the same in a cool operating condition.

The ledge 13 is preferably provided with recesses 26 constituting, when the bearing is in place within the housing, through ducts capable of receiving any overflow from the pocket 24 and discharging the same to the portion of the housing below the bearing. Lubricating fluid is supplied to the bearing through a conduit 27 passing through an opening in the bearing housing 12, the lubricating fluid being conveyed to a point where it is discharged into the pocket 21 at the upper end of the friction element 18.

During the operation of a machine provided with the bearing illustrated, lubricating fluid is discharged through the pipe or conduit 27 to the pocket 21 whence the amount required for thoroughly lubricating the friction surface of the shaft passes to the lubricating grooves 23, the fluid gradually working downward between the friction surfaces and passing out at the lower end of the bearing. By having the discharge from the conduit 27 greater than the amount required for properly lubricating the friction surfaces, the excess of fluid, that is, the portion not required for lubricating purposes, overflows into the recess or pocket 24 and passes off through the ducts 25. The fluid passing through these ducts acts to carry away heat from the adjacent portions of the bearing, and the ducts may be so disposed, that is, in the material of the friction element 18, that fluid passing therethrough comes in contact with a comparatively hot portion of the bearing. In case the excess of lubricating fluid cannot be carried off through the ducts 25, a portion of it overflows the flange 20 on the part 15 and passes off through the ducts 26. In the ordinary case, the lubricating fluid passing through the bearing is collected and, after being passed through some cooling medium, is again carried through the feed conduit 27 to the upper side of the bearing.

It will be apparent that the broad features of this invention may be utilized in structures different from that shown, as for instance, a single pocket may be provided at the upper side of the bearing, or, in fact, no pocket at all, as where the housing is utilized as a pocket to insure a sufficient supply of lubricating fluid to the friction surfaces, and the supply of excess lubricating fluid to the cooling ducts may be insured by having nipple-like extensions of the cooling ducts, the inlet to which is appreciably above the point of entrance of the lubricating fluid to the friction surfaces. Likewise, the supply of lubricating fluid to the ducts for cooling purposes may be partially or wholly independent of the head on the lubricating fluid supplied to the friction surfaces.

It will be apparent that, in accordance with this invention, an artificial cooling system for bearings is provided, the same utilizing the material and parts of the ordinary bearing and not requiring any extended special construction.

It is to be understood that it is not desired that the invention defined by the claims be limited to the exact details of construction shown and described, for obvious modifications will occur to a person skilled in the art.

It is claimed and desired to secure by Letters Patent:

1. A bearing having a recess or pocket adapted to receive lubricating fluid and communicating with the friction surface of the bearing, and a second recess or pocket communicating with said first pocket and adapted to receive lubricating fluid therefrom only when the fluid in said first pocket attains a certain level, a cooling duct communicating with said second pocket and passing through a portion of said bearing, and means for feeding lubricating fluid to said first pocket.

2. A bearing having a recess or pocket adapted to receive lubricating fluid and communicating with the friction surface of the bearing, a second recess or pocket communicating with said first pocket and adapted to receive lubricating fluid therefrom only when the fluid in said first pocket attains a certain level, and a cooling duct communicating with said second pocket and passing through a portion of said bearing, said cooling duct having its discharge end below its inlet end to provide for a gravity circulation of fluid therethrough, and means for feeding lubricating fluid to the bearing and adapted to discharge directly to said first pocket.

3. A bearing having a recess or pocket at its upper side adapted to receive lubricating fluid, said pocket having a countersunk portion communicating with the friction surface of said bearing, and cooling ducts through a portion of said bearing and opening into the body portion of said pocket.

4. A bearing having a recess or pocket adapted to receive lubricating fluid and communicating with the frictional surface of the bearing and adapted to supply lubricating fluid thereto, a cooling duct passing through a portion of said bearing and communicating with said pocket, the inlet to said cooling duct being at a higher level than the inlet to said frictional surface, and means for supplying lubricating fluid to said pocket at a point removed from the inlet to said cooling duct whereby the lubricating fluid supplied to said cooling duct is only the excess beyond that required for properly lubricating the frictional surface of the bearing.

5. A bearing having a recess or pocket adapted to receive lubricating fluid, a second recess or pocket radially outside of said first pocket and communicating therewith and receiving fluid therefrom only when the fluid in said first pocket reaches a certain level, and a cooling duct communicating with said second pocket and passing through a portion of said bearing, said cooling duct having its discharge end below its inlet end to provide for a gravity circulation of fluid therethrough, the friction surface of said bearing being provided with lubricating grooves communicating with said first pocket, and means for feeding lubricating fluid directly to said first pocket.

6. A bearing comprising an outer portion of comparatively rigid material and an inner concentrically arranged portion of friction material, said bearing being provided with a recess or pocket at its upper side adapted to receive lubricating fluid and communicating with the friction surface of said bearing, and a second recess or pocket communicating with said first pocket and adapted to receive lubricating fluid therefrom only when the fluid in said first pocket reaches a certain level, and cooling ducts through the inner portion of said bearing and communicating with said second pocket, and a conduit for feeding lubricating fluid to the friction surface of said bearing and having its point of discharge over said first pocket.

7. A bearing comprising an outer portion of comparatively rigid material provided with spaced internal projections and an inner concentrically arranged portion of friction material provided with spaced external projections which lock with the projections of the outer portion to hold said parts together, said bearing being provided with a recess or pocket at its upper side adapted to receive lubricating fluid and communicating with the friction surface of the bearing, a second recess or pocket communicating with said first pocket and adapted to receive lubricating fluid therefrom only when the fluid in said first pocket obtains a certain level, and cooling ducts passing through the external projections of the inner portion of said bearing and communicating with said second pocket.

8. A bearing for vertically disposed shafts comprising outer and inner concentrically arranged parts, said parts being provided with interlocking projections, said bearing being provided with a recess or pocket at its upper side adapted to receive lubricating fluid and communicating with the friction surface of said bearing, a second recess or pocket communicating with said first pocket and adapted to receive fluid from said first pocket only when the fluid therein reaches a certain level, and cooling ducts passing through the projections of the inner portion of said bearing and opening into said second pocket.

9. A bearing for vertically extending shafts comprising an outer portion of rigid material and an inner concentrically arranged portion of friction material, said bearing being provided with a recess or pocket at the upper axial end thereof adapted to receive lubricating fluid, said recess being formed with a countersunk portion communicating with lubricating grooves formed in the friction surface of said bearing, and cooling ducts passing through said bearing and opening into the body portion of said pocket.

10. A bearing having a cooling duct, and means for supplying lubricating fluid in parallel to said cooling duct and the friction surface of the bearing.

11. A bearing having a cooling duct, and means for supplying lubricating fluid to the frictional surface of said bearing and said cooling duct in parallel, the supply of lubricating fluid to said cooling duct being dependent upon the excess of lubricating fluid supplied to the frictional surface of said bearing.

12. A bearing having a reservoir or pocket communicating with and adapted to supply lubricating fluid to the frictional surface of the bearing at one axial end thereof, and a cooling duct through a portion of said bearing communicating with said reservoir adjacent the point of admission of lubricating fluid from said reservoir to the frictional surface of the bearing and adapted to receive only an excess of lubricating fluid beyond that supplied to the frictional surface of the bearing.

13. A bearing provided with a cooling duct, and means for supplying lubricating fluid to the frictional surface of said bearing, there being communication between the inlet for lubricating fluid to the frictional surface of the bearing and said cooling duct whereby only the excess of lubricating fluid not required for lubricating the frictional surface of the bearing may be supplied to said cooling duct.

14. In combination, a shaft, a bearing therefor having a cooling surface for radiating heat from the bearing, and means for supplying lubricating fluid to both the frictional surface and the cooling surface of said bearing in parallel, the inlet to the cooling surface being at a higher level than the inlet to the frictional surface and communicating therewith whereby the excess of lubricating fluid supplied to said frictional surface may flow along said cooling surface.

In testimony whereof, the signature of the inventor is affixed hereto.

ARTHUR J. BROWN.